Jan. 27, 1942.    T. A. ST. CLAIR    2,271,278
CHECK VALVE
Filed June 29, 1939
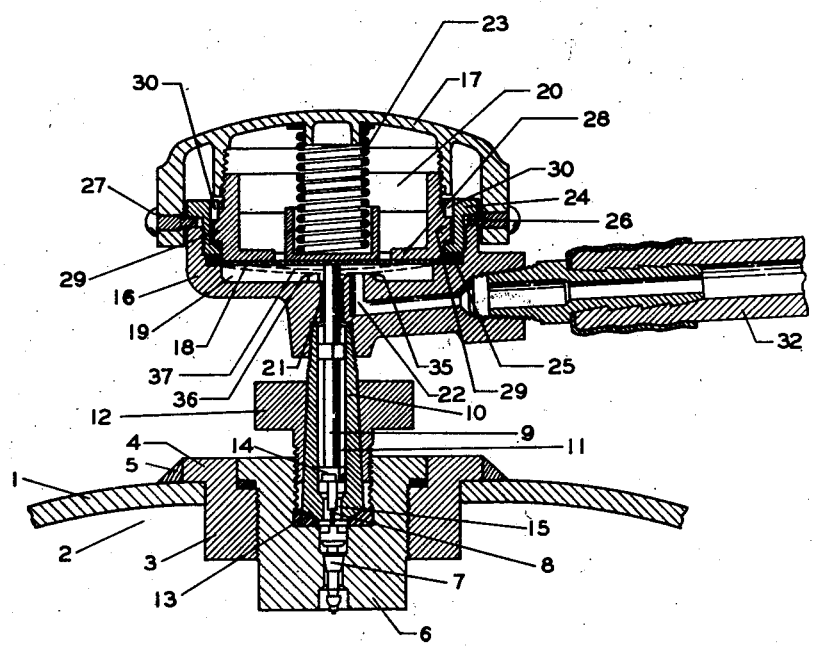
INVENTOR
T.A. ST. CLAIR
BY
ATTORNEYS

Patented Jan. 27, 1942

2,271,278

UNITED STATES PATENT OFFICE

2,271,278

CHECK VALVE

Theodore A. St. Clair, Pontiac, Mich., assignor to Phillips Petroleum Company, a corporation of Delaware Application June 29, 1939, Serial No. 281,967

2 Claims. (Cl. 50—4)

This invention relates to check valves, and, particularly, a valve adapted for use in a fluid pressure regulator.

In the distribution of liquefied petroleum gases by a system, such as the one disclosed in the co-pending application of R. W. Thomas, Serial No. 281,969, filed June 29, 1939, a spring actuated check valve is employed to prevent loss of gas from the system to the atmosphere whenever a storage container is disconnected for replacement. Such check valves are rather delicate; the spring pressure has to be very light in order to avoid too much pressure drop at low pressures and high rates of flow; and they are, therefore, subject to occasional back leakage when an empty container is disconnected to be replaced by a full one. In the ordinary two-drum system where the distributor takes out the empty container and replaces it with a full one immediately, this is of small consequence. However, with the recently developed self-service system, the customer takes the empty container to his retailer and returns some time later with a full one; therefore, any possible leakage is disadvantageous from the viewpoints of economic loss and possible hazard.

An important object of this invention is to provide a positive seating check valve which will give unobstructed flow while open and will be virtually leak-proof when closed.

A further object of this invention is to combine this valve with a fluid pressure regulator.

Other objects and advantages will be apparent from the description and the drawing which represents a vertical cross-section view through the center of a gas pressure regulator illustrating a preferred embodiment of the present invention used therewith.

In the drawing where similar characters designate similar parts, a gas pressure regulator of the type disclosed in the co-pending application of R. W. Thomas, Serial No. 281,969, filed June 29, 1939, is illustrated and will now be described.

A portion of a liquefied gas or high pressure gas container is designated by reference numeral 1 while 2 represents the interior of this container. An annular ring 3 having a shoulder 4 is attached to the container at 5. Ring 3 is tapped to receive a plug member 6 which is drilled and tapped to contain a valve 7 of the tire valve core type. Directly above tire valve core stem 8 is a push-pin 9. Concentric with push-pin 9 is a tube 10 which is of sufficient diameter inside to provide an annular passageway 11. Tube 10 is threaded at the top and tapered in the manner of a truncated cone. Concentric with tube 10 is a connector 12 bored to receive tube 10 and having its lower portion externally threaded to engage an upper tapped portion of plug member 6. Connector 12 forces tube 10 against resilient gasket 13 forming a gas tight connection between tube 10 and plug member 6. Push-pin 9 is provided with a guide 14 which will not pass through passageway 15; this prevents the push-pin from dropping out when this assembly is disconnected from a container.

A regulator housing comprising a body 16 and a cover 17 is provided with a flexible diaphragm 18 dividing the housing into two compartments, namely, a fluid compartment 19 and a loading compartment 20. Fluid compartment 19 is provided with an inlet port 21 in communication with tube 10, and with an outlet port 22. Loading compartment 20, which is vented to the atmosphere, contains an expansion spring 23. A diaphragm retainer 24 with a threaded connection to body 16 bears upon diaphragm slip ring 25 which in turn holds diaphragm 18 securely in place. Retainer 24 is so shaped as to provide a circumferential groove 26 into which screws 27 extend holding the cover 17 in place on the regulator body 16, but at the same time allowing cover 17 to be rotated with respect to regulator body 16. Loading compartment 20 is provided with a diaphragm stop 28 for controlling the effective diaphragm area which in turn will control the discharge pressure of the regulator. Diaphragm stop 28 is in threaded engagement with cover 17 and is provided with lugs 29 which are free to move vertically in slots 30, formed in diaphragm retainer 24, but which prevent the diaphragm stop from rotating relative to the regulator body 16.

The operation of this regulator is similar to the operation of the one disclosed in the co-pending application of Kenneth R. Lewis, Serial No. 201,581, filed April 12, 1938; its operation is as follows:

The compression spring 23 in loading compartment 20 exerts a pressure upon diaphragm 18. The resulting downward thrust of the diaphragm is transmitted through push-pin 9 and valve stem 8 to tire valve core 7, actuating the same.

High pressure gas in container 1 passes upwardly through main valve 7, in which its pressure is reduced by throttling action, through the annular passageway 11 and inlet port 21 to the fluid compartment 19, and thence out of the fluid compartment through outlet port 22.

Should the pressure in the fluid compartment become excessive, the diaphragm will be forced in an upward direction allowing the push-pin 9 to move upwardly, which in turn will release valve stem 8 allowing the valve 7 to close. The valve will remain closed until the pressure in the fluid compartment falls to a point where the compression spring is enabled to force the diaphragm and plunger downward reopening the valve. Constant withdrawal of vapor through outlet port 22 usually results in a throttling action by valve 7 to maintain a constant pressure in compartment 19.

Outlet port 22 is provided with raised nozzle 35 to present a valve seat. Two diaphragm stops 36, whose tops are on the same level as the top of the nozzle, are provided in the regulator body.

In operation, the pressure in service compartment 19 is normally sufficient to maintain a diaphragm position as illustrated by diaphragm 18 in the figure. This leaves the outlet port unobstructed, allowing a free flow of gas through the port. Should the pressure in compartment 19 drop to a low value, as for example, when the regulator is disconnected from its source of supply, the spring 23 will force diaphragm 18 downward to the position shown by the dotted lines 37, pushing the diaphragm against nozzle 35 and effectively sealing off port 22, thereby preventing gas from entering compartment 19 through port 22 and escaping to the atmosphere through port 21 and annular passageway 11. The two diaphragm stops 36 are provided to prevent cocking of the diaphragm when it is against the nozzle. Compartment 19 is always in communication with tube 10 so that when a new cylinder is connected, the gas can readily flow under the diaphragm, forcing the diaphragm upward to its normal operating position, opening outlet port 22, and thereby putting the regulator in service.

While I have shown the diaphragm acting as a valve face and seating directly on the nozzle to form a check valve, it is apparent that various types of valve seats might be used in place of the nozzle, and that the diaphragm could be provided with a valve face or gasket of any suitable material to seat upon the nozzle. Since this valve does not depend upon the force of gravity for its operation, it is evident that it will operate equally well with the regulator in any position.

While I have herein described and illustrated, by way of example, a preferred embodiment of my invention, it is to be understood that various changes may be made in size, shape, and arrangement of parts without departing from the spirit of my invention as expressed in the following appended claims.

I claim:

1. A fluid pressure regulator comprising a casing, a diaphragm in the casing defining a fluid compartment, a fluid inlet passage and a fluid outlet passage communicating with the fluid compartment, a main valve associated with the inlet passage, means in the inlet passage cooperating with the main valve and the diaphragm for opening the main valve upon predetermined movement of the diaphragm in one direction, loading means for normally urging the diaphragm into main valve opening position, and means limiting extreme movement of the diaphragm in the direction of main valve opening position including a valve seat in the upstream end of the outlet passage to one side of the first mentioned means, said diaphragm serving as a valve to engage the valve seat and close the outlet passage on extreme movement of the diaphragm in main valve opening direction.

2. A detachable fluid pressure regulator adapted to be connected to a source of fluid under pressure comprising a casing, a diaphragm in the casing dividing the interior thereof into a fluid compartment and a loading compartment, a fluid inlet passage and a fluid outlet passage in the fluid compartment, a main valve associated with the inlet passage, means in the inlet passage cooperating with the main valve and the diaphragm for opening the valve upon predetermined movement of the diaphragm in one direction, spring means in the loading compartment for normally urging the diaphragm into main valve opening position, and means limiting extreme movement of the diaphragm in the direction of main valve opening position including a valve seat in the upstream end of the outlet passage to one side of the first mentioned means, said diaphragm serving as a valve to engage the valve seat and close the outlet passage on extreme movement of the diaphragm in main valve opening position.

THEODORE A. ST. CLAIR.